United States Patent
Sugita

(10) Patent No.: US 10,444,494 B2
(45) Date of Patent: Oct. 15, 2019

(54) LENS APPARATUS AND IMAGE PICKUP APPARATUS USING SAME

(71) Applicant: CANON KABUSHIKI KAISHA, Tokyo (JP)

(72) Inventor: Jun Sugita, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/484,354

(22) Filed: Apr. 11, 2017

(65) Prior Publication Data

US 2017/0299859 A1    Oct. 19, 2017

(30) Foreign Application Priority Data

Apr. 19, 2016  (JP) ................................. 2016-083525

(51) Int. Cl.
```
G02B 7/00      (2006.01)
G02B 27/00     (2006.01)
G02B 7/02      (2006.01)
G02B 7/04      (2006.01)
G02B 7/08      (2006.01)
```
(52) U.S. Cl.
CPC ......... *G02B 27/0006* (2013.01); *G02B 7/003* (2013.01); *G02B 7/023* (2013.01); *G02B 7/025* (2013.01); *G02B 7/04* (2013.01); *G02B 7/08* (2013.01)

(58) Field of Classification Search
CPC ...... G02B 7/0006; G02B 7/003; G02B 7/023; G02B 7/04; G02B 27/0006; G02B 7/08

USPC ........................................................ 359/507
See application file for complete search history.

(56) References Cited

U.S. PATENT DOCUMENTS

| | | | |
|---|---|---|---|
| 9,170,395 B2 | 10/2015 | Sasaki | |
| 2005/0270668 A1* | 12/2005 | Seita | B29C 65/1635 359/811 |
| 2012/0218651 A1* | 8/2012 | Onishi | G02B 7/08 359/824 |
| 2016/0062071 A1* | 3/2016 | Hasegawa | G02B 7/023 359/739 |

FOREIGN PATENT DOCUMENTS

| | | |
|---|---|---|
| JP | 2003140017 A | 5/2003 |
| JP | 2005128250 A | 5/2005 |
| JP | 2006091153 A | 4/2006 |
| JP | 2008233771 A | 10/2008 |
| JP | 2008298915 A | 12/2008 |
| JP | 2015028599 A | 2/2015 |

\* cited by examiner

*Primary Examiner* — Euncha P Cherry
(74) *Attorney, Agent, or Firm* — Rossi, Kimms & McDowell LLP

(57) ABSTRACT

A lens apparatus according to the present invention includes: an optical unit capable of decentering adjustment in a direction orthogonal to an optical-axis; a fixed exterior unit on the outer peripheral side of the optical unit; a decentering absorption member contacting the inner periphery of the fixed exterior unit and permitting movement of the optical unit in the direction orthogonal to the optical-axis; a hold member holding the optical unit; and an adhesive positioned between the hold member and the decentering absorption member in the direction orthogonal to the optical-axis.

29 Claims, 7 Drawing Sheets

LENS APPARATUS AND IMAGE PICKUP APPARATUS USING SAME

BACKGROUND OF THE INVENTION

Field of the Invention

The present invention relates to a lens apparatus capable of decentering adjustment of an optical unit and suppressing entry of dust and water from a gap between the optical unit and an exterior unit, and an image pickup apparatus using the lens apparatus.

Description of the Related Art

Heretofore, a lens apparatus has been widely known which includes an optical unit that moves in the optical axis direction inside an exterior unit which is a fixed part.

Further, Japanese Patent Application Laid-Open No. 2008-233771 discloses a lens apparatus configured such that a fixed barrel which holds an entire system of optical units is provided integrally with a flange portion on the outer periphery of the fixed barrel around the front side of the lens apparatus, and a filter frame unit which is an exterior unit surrounding an optical unit is held on the flange portion.

Also, Japanese Patent Application Laid-Open No. 2003-140017 discloses a lens apparatus which includes an optical unit capable of moving in the optical axis direction along the inner periphery of a front fixed barrel, which is a fixed exterior member, and allows attachment of an accessory such as a filter to the front fixed barrel in attempt to achieve a dust- and sand-proof function.

Also, U.S. Pat. No. 9,170,395 discloses a lens apparatus which includes an optical unit capable of moving in the optical axis direction along the inner periphery of a front frame, which is a fixed exterior unit, and also allows parallel decentering adjustment of the optical unit relative to a straight movable barrel via an adjustment ring.

Also, Japanese Patent Application Laid-Open No. 2008-298915 discloses a lens apparatus capable of relaxing impact with a filter frame provided on the object side.

SUMMARY OF THE INVENTION

To achieve the above object, a lens apparatus according to the present invention includes: an optical unit capable of decentering adjustment in an direction orthogonal to the optical-axis; a fixed exterior unit on an outer peripheral side of the optical unit; a decentering absorption member contacting an inner periphery of the fixed exterior unit and permitting movement of the optical unit in the direction orthogonal to the optical-axis while being fixed in the direction orthogonal to the optical-axis; a hold member holding the optical unit; and an adhesive positioned between the hold member and the decentering absorption member in the direction orthogonal to the optical-axis.

Further features of the present invention will become apparent from the following description of exemplary embodiments with reference to the attached drawings.

DESCRIPTION OF THE EMBODIMENTS

In the above-mentioned Japanese Patent Application Laid-open No. 2008-233771, a first-group unit which is an optical unit is not configured to undergo decentering adjustment relative to a first-group movable barrel and is only expected to move in the optical axis direction. Then, if the first-group unit is to be configured to be capable of decentering relative to the filter frame unit, a gap must be provided between the filter frame unit and the first-group unit. In that case, water, dust, or the like might enter the inside from that gap.

Also, in Japanese Patent Application Laid-open No. 2003-14001 too, a lens hold frame including the optical unit is not configured to undergo decentering adjustment. Further, a dust-block tape is disposed on the lens hold frame, and a small gap is left between the dust-block tape and the front fixed barrel such that not much slide resistance is generated but dust is still blocked. Then, if the lens hold frame is decentered in this configuration, the gap between the front fixed barrel and the dust-block tape will change. Thus, it is impossible to control the size of the gap and therefore to block dust and sand.

In U.S. Pat. No. 9,170,395, the optical unit is structurally capable of decentering adjustment. Again, since the optical unit is decentered relative to the front frame, which is an exterior unit, a gap would be present between the optical unit and the front frame, and water, dust, or the like might enter the inside from that gap.

An object of embodiments is to provide a lens apparatus capable of performing decentering adjustment of an optical unit and also reducing the amount of entry of dust and water from a gap between the optical unit and an exterior unit as compared to conventional structures, and to provide an image pickup apparatus using the lens apparatus.

Preferred embodiments of the present invention will now be described in detail in accordance with the accompanying drawings.

Note that in the specification of the present application, a lens apparatus' object side (object side) and imaging side (image plane side) in the optical axis direction will be expressed as a front side and a rear side, respectively.

First Embodiment (Image Pickup Apparatus)

Figure 9:
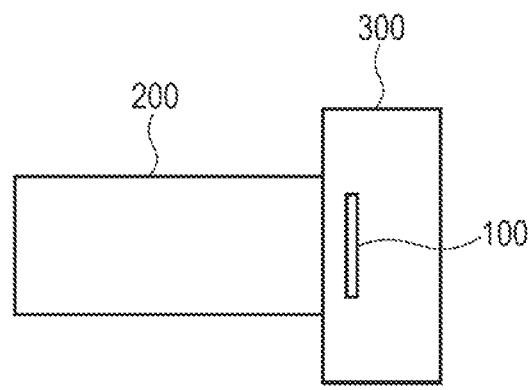
FIG. 9 is an explanatory view of an image pickup apparatus using a lens apparatus according an embodiment of the present invention.

FIG. 9 is an explanatory view of an image pickup apparatus using a lens apparatus according to an embodiment of the present invention. A lens apparatus 200 is coupled to a camera body 300 including an image pickup element 100.

(Lens Apparatus)

Figure 1:
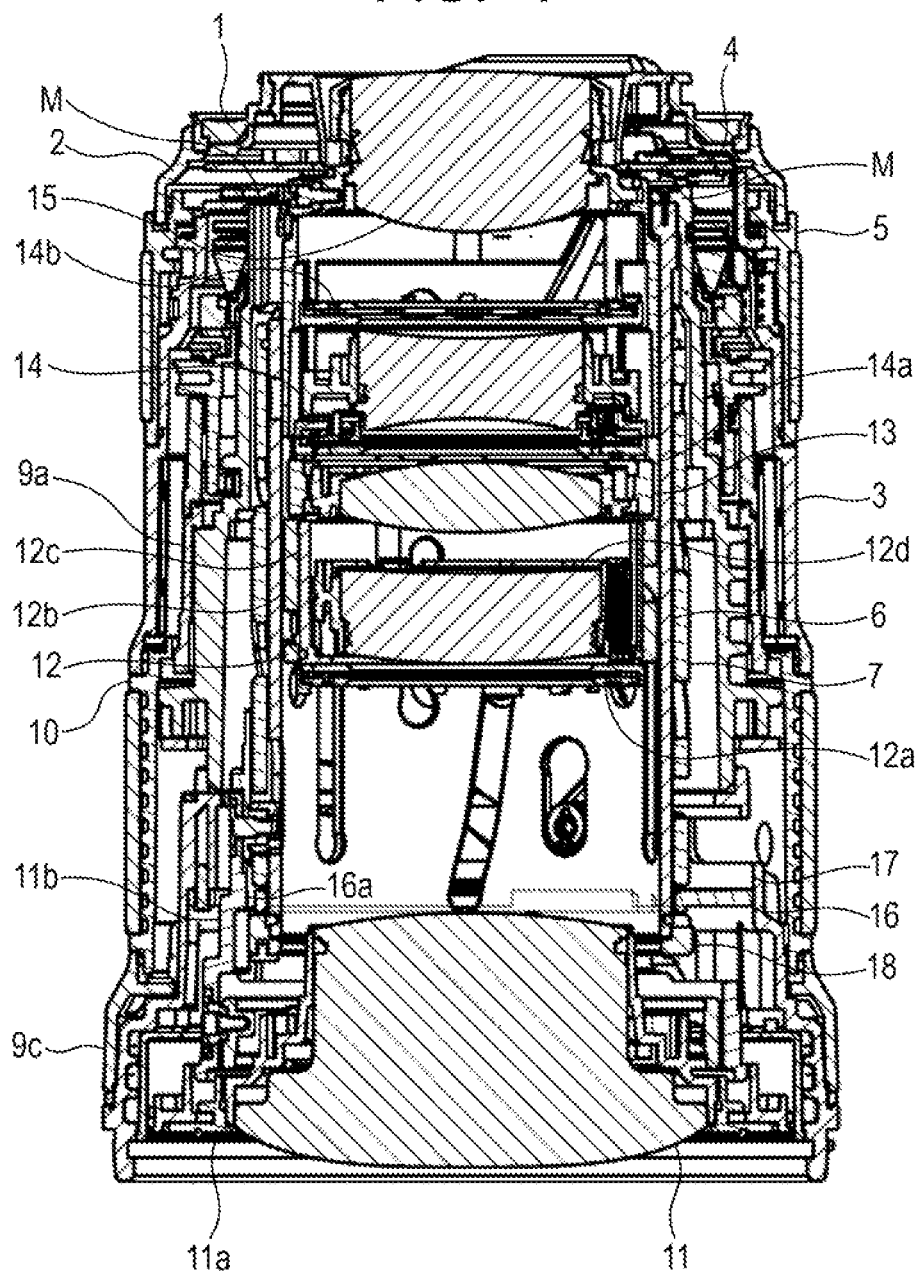
FIG. 1 is a cross-sectional view of a lens apparatus according an embodiment of the present invention.
Figure 2:
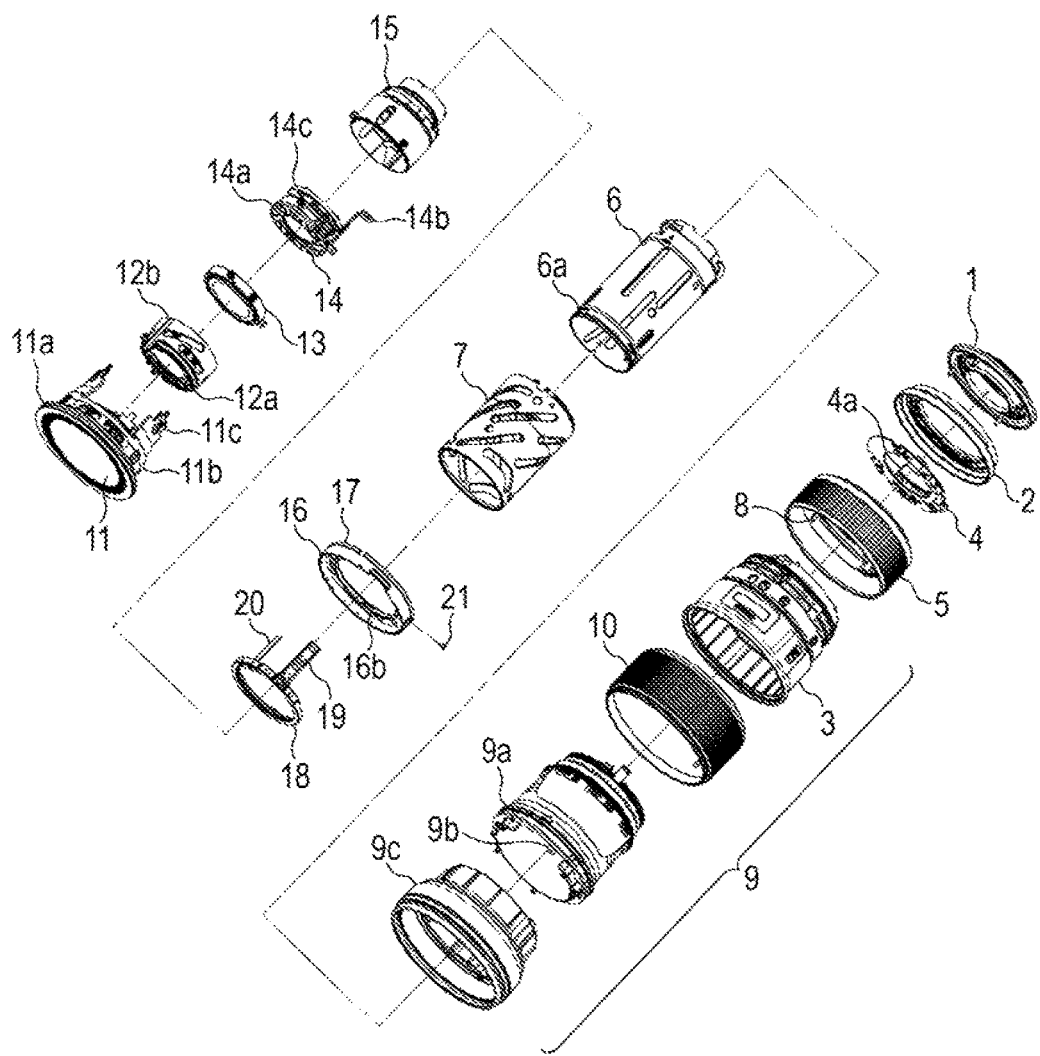
FIG. 2 is an exploded perspective view of the lens apparatus according to the embodiment of the present invention.

The lens apparatus 200 will be described below. In FIGS. 1 and 2, reference numeral 1 denotes a mount to be connected to the camera body 300, reference numeral 3 denotes a fixed barrel, reference numeral 2 denotes a mount ring, the thickness of which is adjusted by cutting to adjust the gap between the mount 1 and the fixed barrel 3, and reference numeral 4 denotes a control board that, is held on the fixed barrel and performs operation control. On the control board 4, a contact block 4a (FIG. 2) is provided for connection to an electric contact on the camera side.

Further, reference numeral 6 denotes a guide barrel coupled to the fixed barrel 3 and including guide grooves for linearly guiding movable groups, and reference numeral 7 denotes a cam ring held so as to be capable of rotating at a fixed position about the optical axis relative to the guide barrel 6 and including cam grooves for moving the movable groups forward and backward in the optical axis direction with rotation. The cam ring 7 is mounted from the front side (object side) of the guide barrel 6 and is engaged by a zoom ring 5 held on the fixed barrel 3 so as to be capable of rotating at a fixed position about the optical axis and a zoom key 8 (FIG. 2).

A first movable group 11, a second movable group 12, a third movable group 13, a fourth movable group 14, and a fifth movable group 15, which are optical units, are held in or on the guide barrel 6. Moreover, cam followers provided at intersections of the guide grooves in the guide barrel 6 and the cam grooves in the cam ring 7 support these optical units and determine their positions in the optical axis direction.

Note that the second movable group 12 is also a focus group for focus adjustment and includes a second-group movement ring 12c and focus cars ring 12b and a second-group unit 12d held therein. Further, an auxiliary stop A unit 12a (FIG. 2) that cuts unnecessary off-axis ray is held on the second-group movement ring 12c, and its aperture changes according to the position of the second movable group 12 in the optical axis direction.

Also, an electromagnetic stop unit 14a is held in the fourth movable group 14, and the electromagnetic stop unit 14a is electrically connected to the control board 4 by a flexible printed wiring board 14b. Specifically, a drive motor and a photo-interrupter that detects the opening state of the blades of a stop on the electromagnetic stop unit 14a are electrically connected to the control board 4 by the flexible printed wiring board 14b.

Further, an auxiliary stop B unit 14c (FIG. 2) that determines Fno is held on the rear side (image plane side) of the fourth movable group 14, and its aperture changes according to the position of the fourth movable group 14 in the optical axis direction, as in the auxiliary stop A unit 12a.

Note that the movable groups from the second movable group 12 to the fifth movable group 15 are disposed radially inside the guide barrel 6 whereas the first movable group 11 is disposed radially outside the cam ring 7, and the movable groups are held at the positions of the intersections of the guide grooves in the guide barrel 6 and the cam grooves in the cam ring 7.

Also, a bayonet hook 16b (FIG. 2) on a deformation receiving member 16 is held on the front side of the guide barrel 6 by being engaged with a bayonet groove 6a (FIG. 2) in the guide barrel 6 in order to relax deformation caused by external impact. After being mounted, the deformation receiving member 16 is integrated with the guide barrel 6 with its rotational position fixed by a fixing screw 21 (FIG. 2). Penetrating holes 16a are provided in the deformation receiving member 16, and leg parts 11c on a first-group movable ring 11b of the first movable group 11 are inserted through the penetrating holes 16a and engaged with the guide barrel 6 and the cam ring. Further, an impact relaxation member 17 in the form of tape made of an elastic material is disposed on the outer peripheral side of the deformation receiving member 16.

Now, assume a case of placing the cam ring 7 on the outer periphery of the guide barrel 6 in the conventional configuration in which a flange portion is disposed to couple an exterior unit 9 to the guide barrel 6 on the front side (object side) of the lens apparatus. In this case, the cam ring 7 has to be mounted from the rear side (image plane side) of the guide barrel 6. However, in order to mount the cam ring 7 from the rear side (image plane side), the outer diameter of the rear portion (image plane side) of the guide barrel 6 is inevitably made smaller than the inner diameter of the cam ring 7. In addition, screw seats for coupling parts are provided at the rear end of the guide barrel 6. Then, for example, the outer diameter of the whole lens apparatus must be increased or a limitation must be imposed on the size of the optical units that move inside, which is not disadvantageous for size reduction.

In view of this, in the configuration of this embodiment, the exterior unit 9 is coupled to the guide barrel 6 on a rear side (image plane side) M (FIG. 1) of the lens apparatus. This enables size reduction.

Further, a relay ring 18 is held on the front end of the guide barrel 6 so as to foe capable of rotating at a fixed position. The second movable group 12 is moved in the optical axis direction for focus adjustment when the focus cam ring 12b is rotated via a coupling key A19 (FIG. 2) and a coupling key B20 (FIG. 2) attached to the relay ring 18. The coupling key A19 is attached through one of the penetrating holes 16a in the deformation receiving member 16. Thus, the relay ring 18 rotates within a limited operation range at a fixed position.

The exterior unit 9 (FIG. 2), including a focus unit 9a and a front unit 9c, is fixed to the rear end (image plane side) of the guide barrel 6 at positions different in phase from the positions coupled to the fixed barrel 3. A filter thread and a hood mount are provided to the front unit 9c.

Also, a focus ring 10 for manual focus adjustment is held on the exterior unit 9 so as to be capable of rotating at a fixed position. The focus ring 10 can transmit rotational force to the focus unit 9a. Meanwhile, the focus unit 9a can be driven by an annular vibration-wave motor (ultrasonic motor) upon receipt of a control signal and electric power from the control board 4. Then, the exterior unit 9 can be engaged at a focus key 9b thereof manually or electrically with the coupling key A19, held on the relay ring 18, and the rotational force can be transmitted from the coupling key B20, held on the relay ring 18, to the focus cam ring 12b.

(First Movable Group 11 AS Optical Unit)

The operation of the first movable group 11, which is an optical unit, will be described first. FIG. 1 is a cross-sectional view of the lens apparatus according to this embodiment at the wide angle end. In rooming, when the room ring 5 is operated, the cam ring 7 is rotated by the zoom key 8 of the zoom ring 5, so that each of the movable groups from the second movable group 12 to the fifth movable group 15 moves from the rear side (image plane side) toward the front side (object side). The first movable group 11 makes what is called U-turn motion in which it first moves toward the rear side (image plane side) and then moves toward the front side (object side).

During this operation, the auxiliary stop A unit 12a, held on the second movable group 12, which is an optical unit, shifts from a state where its blades are closed to a certain degree to a state where the blades are widely opened as the lens apparatus shifts from the wide angle end to the telephoto end. This means that the auxiliary stop A unit 12a functions to block unnecessary off-axis ray and thereby cut flare when on the wide angle side.

Further, like the auxiliary stop A unit 12a, the auxiliary stop B unit 14c, held on the fourth movable group 14, which is an optical unit, shifts from a state where its blades are closed to a certain degree to a state where the blades are widely opened as the lens apparatus shifts from the wide angle end to the telephoto end. The auxiliary stop B unit 14c functions to determine the open aperture at each focal-length position during zooming operation.

Focus adjustment operation is as described above. It is possible to manually operate the focus ring 10 on the exterior unit 9 instead of electrically driving it via electric control. Specifically, the focus key 9b of the exterior unit 9 is engaged with the coupling key A19 of the relay ring 18, and the rotational force is transmitted to the focus cam ring 12b through the coupling key B20 of the relay ring 18. Then, as the focus cam ring 12b is rotated, the second-group unit 12d, integrally held in the second-group movement ring 12c, is moved forward or backward in the optical axis direction, thereby adjusting the focus.

Figure 3:
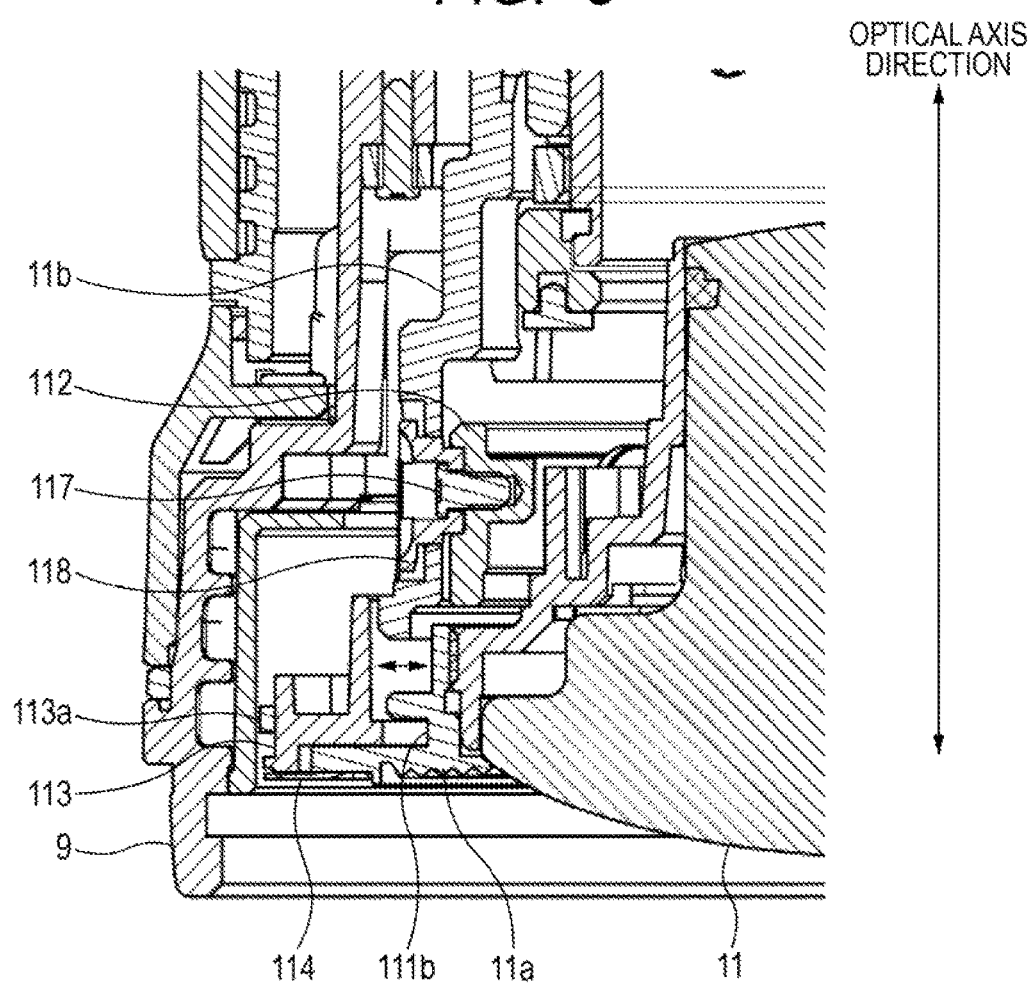
FIG. 3 is an enlarged cross-sectional view of a part of the lens apparatus according to the embodiment of the present invention.
Figure 4:
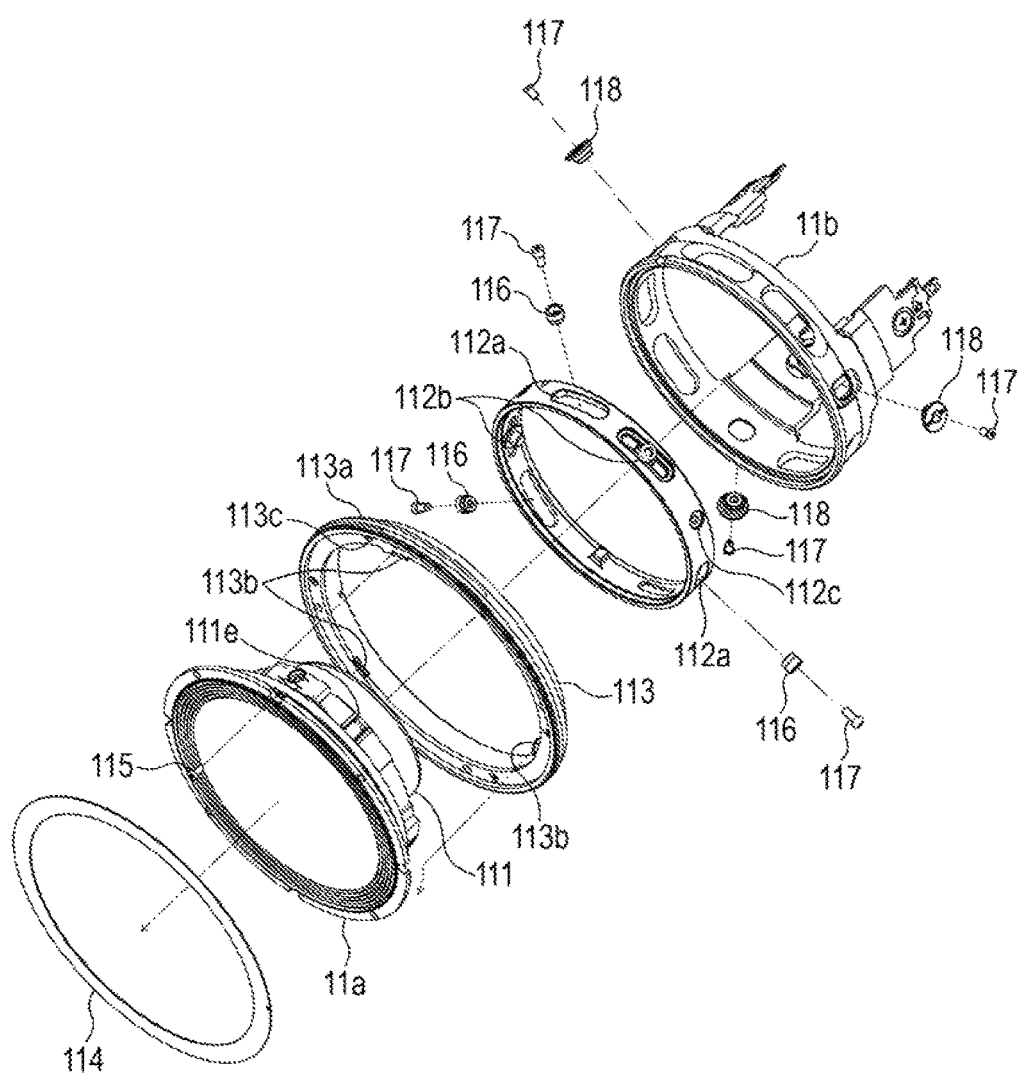
FIG. 4 is an exploded perspective view of a first movable group in the lens apparatus according to the embodiment of the present invention.

Now, a peripheral configuration of the first movable group 11, which is an optical unit, will be described in detail. FIGS. 3 and 4 are views illustrating the peripheral configuration of the first movable group 11 in detail. The first movable group 11 includes a first-group press ring 11a, the first-group movement ring 11b, and the leg parts 11c, as illustrated in FIG. 2, and further includes an adjustment ring 112 and a decentering absorption ring 113.

In FIG. 3, reference numeral 111 denotes a first-group unit holding the first movable group 11, which is an optical unit, with the first-group press ring 11a. The first-group unit 111 is held in the adjustment ring 112 through cam grooves 112a by rollers 116 and fastening screws 117 so as to be capable of being moved for adjustment in the optical axis direction.

The first-group unit 111, when rotated, moves in the optical axis direction along the inclination of the cam grooves 112a in the adjustment ring 112. After such movement, rotation restriction members 112b (FIG. 4) screwed to the adjustment ring 112 are engaged with engagement portions 111e (FIG. 4) of the first-group unit 111, thereby fixing the position in the optical axis direction. Meanwhile, reference numeral 112c in FIG. 4 denotes a roller seat.

Further, the adjustment ring 112, holding the first-group unit 111, is held in the first-group movement ring 11b by an eccentric roller 118 and a fastening screw 117 disposed at three positions about the optical axis. The outer periphery of each eccentric roller 118 is eccentric relative to the axis position of the fastening screw 117. Thus, by individually rotating the eccentric rollers 118 at the three positions, the axis position of the first-group unit 111 can be adjusted via the adjustment ring 112. In other words, via decentering adjustment of the first movable group 11, which is an optical unit held in the first-group unit 111, relative the other optical units, the optical performance can be adjusted.

(Decentering Absorption Ring)

On the first-group unit 111, holding the first movable group 11, which is an optical unit, the decentering absorption ring 113 is held as a decentering absorption member (decentering permission member) that moves together in the optical axis direction to permit movement of the first movable group 11 while being fixed in an optical-axis orthogonal direction (direction orthogonal to the optical axis). A seal ribbon 113a in the form of tape as a slide member is attached to the outer periphery of the decentering absorption ring 113. In this embodiment, the decentering absorption member includes the decentering absorption ring 113 and the seal ribbon 113a but may include only the decentering absorption ring 113. The decentering absorption member may be made of a hard material such as metal or a soft material such as rubber.

As described, in this embodiment, the decentering absorption member closes the gap between the exterior unit 9 and the first movable group 11, which is an optical unit. In this way, it is possible to suppress entry of dust and water from the first-group unit 111, which is the front group, "To suppress" here does not, of course, mean that entry of dust and water is ideally prevented but means that the amount of entry of dust and water can be reduced as compared to conventional structures.

Figure 5:
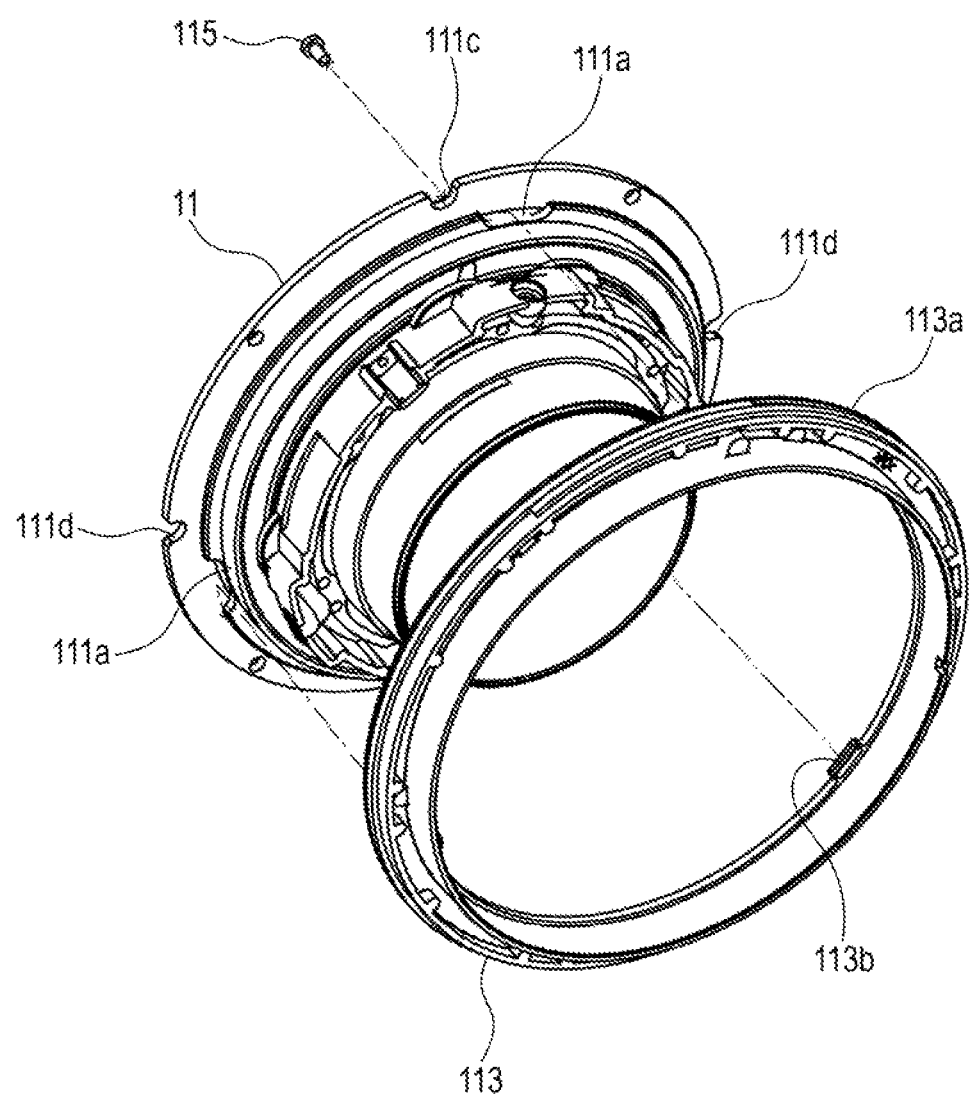
FIG. 5 is an exploded perspective view of a part of the first movable group in the lens apparatus according to the embodiment of the present invention as seen from a different angle.

More specifically, the decentering absorption ring 113 includes engagement hooks 113b (FIG. 5) passed through engagement-hook insertion portions 111a (FIG. 5) of the first-group unit 111 and rotated to positions where the engagement hooks 113b are clamped by optical-axis-direction restriction grooves 111b (FIG. 3) (bayonet-coupling). In this way, the decentering absorption ring 113 is integrated with the first-group unit 111 in the optical axis direction.

Here, as illustrated in FIG. 3, the first-group unit 111 as a hold member holding the first movable group 11, which is an optical unit, and the decentering absorption ring 113 are designed relative to each other such that one of them includes a protruding portion and the other includes a recessed portion.

Figure 6:
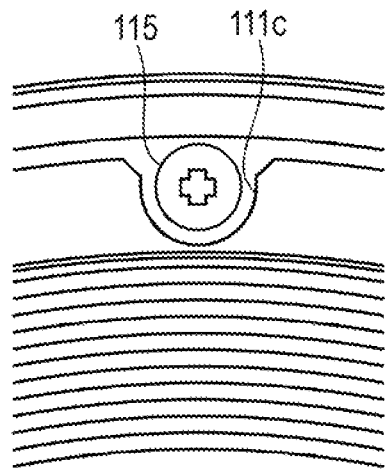
FIG. 6 is a view illustrating a clearance in a direction orthogonal to the optical-axis between a decentering absorption ring and a first-group unit in the lens apparatus according to the embodiment of the present invention.

Further, as illustrated in FIG. 6, a small clearance is provided between an outer contour of each locking screw 115 attached to a screw seat 113c on the decentering absorption ring 113 to be integrated with the decentering absorption ring 113, and a locking grove 111c in the first-group unit 111, holding the first movable group 11. In this way, the first-group unit 111 can be moved by the clearance in the optical-axis orthogonal direction relative to the decentering absorption ring 113, which is fixed in the optical-axis orthogonal direction. In other words, the first-group unit 111, holding the first movable group 11, can be adjusted by the clearance in the optical-axis orthogonal direction relative to the decentering absorption ring 113.

In this way, it is possible to close the gap between the inner periphery of the exterior unit and the outer periphery of the optical unit with the decentering absorption member (suppress entry of dust and water from the gap) and also to move the first-group unit 111, holding the first movable group 11, in the optical-axis orthogonal direction for its decentering adjustment relative to the other units.

Specifically, the exterior unit 9 is mounted to the optical units including the first movable group 11. Here, in a case where the axis position of the first-group unit 111 has been adjusted and decentered relative to the other optical units, the decentering absorption ring 113, which is fixed in the optical-axis orthogonal direction, is present along the inner periphery of the exterior unit 9. In other words, the axis positions of the first-group unit 111 and the decentering absorption ring 113 are decentered from each other.

(Impact Resistance)

In the case of a lens apparatus configured such that optical units and an exterior unit designed to surround the whole optical units to the tip are coupled to each other at the rear side of the lens apparatus (the position M in FIG. 1) as in this embodiment, the exterior unit is likely to be flexed when an impact is applied to the exterior unit from a lateral direction, and the exterior unit is then likely to press the optical units inside.

If the exterior unit presses the optical units inside, rollers and a cam of the cam ring holding the optical units, or movable groups, might be damaged. If so, then even after the exterior unit is restored from the deformation, the optical units might not be able to maintain their original state, hence changing the optical performance. Moreover, if the impact is large, the optical units might be plastically deformed such that the actuation itself might become impossible.

Figure 7:
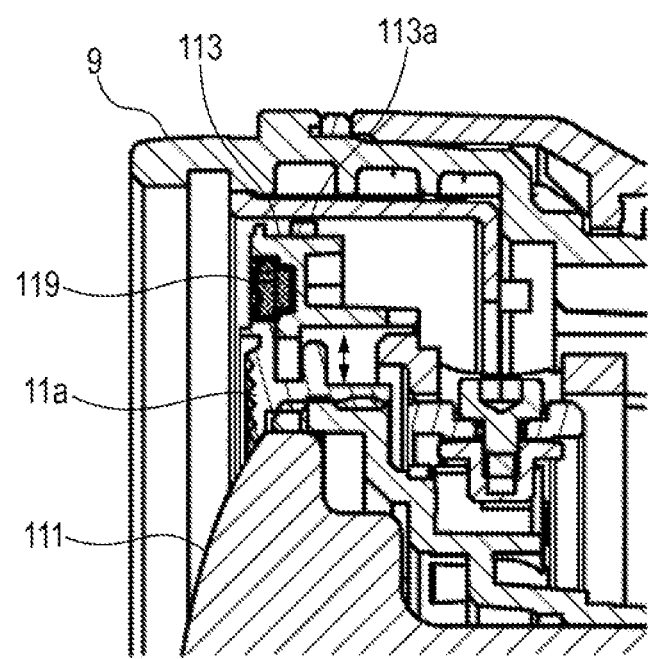
FIG. 7 is an enlarged cross-sectional view of a part including a bonding portion of the first movable group in the first embodiment

In this embodiment, the first-group unit 111 and the decentering absorption ring 113 with their axis positions decentered from each other are integrated with each other by bonding. Specifically, in FIG. 7, recessed portions are provided in the decentering absorption ring 113, and an adhesive is filled therein to bonding portions 111d in the first-group unit 111. Thus, the decentering absorption ring 113 and the first-group unit 111 are integrally fixed to each other when the adhesive hardens.

Here, an adhesive that maintains its elasticity even after hardening (elastic adhesive) can be used as the adhesive for fixing the first-group unit 111 and the decentering absorption ring 113 with their axis positions decentered. In this case, when the exterior unit 9 receives an impact applied from a lateral direction and presses the optical unit 111, the adhesive, maintaining its elasticity even after hardening, cars relax the impact.

Meanwhile, in a case of integrally providing a flange portion to the guide barrel on the front side of the lens apparatus as in Japanese Patent Application Laid-open No. 2008-233771, the cam ring for actuating the optical units that move inside the guide barrel in the optical axis direction is disposed on the inner periphery of the guide barrel. Here, with the cam ring disposed on the inner periphery of the guide barrel, the optical units inside have to be fitted to the cam ring. This adds backlash in the fitting to the cam ring and coaxiality to the guide barrel, which is a fixed part. Accordingly, the positional accuracy might be deteriorated and the optical performance might not be guaranteed.

Also, Japanese Patent Application Laid-open No. 2008-298915 may be able to absorb impact from the optical axis direction to some extent, but cannot be expected to be effective in absorbing impact from a lateral direction.

(Covering)

Note that a cover plate 114 as a facing member is also bonded or attached with double-sided tape or the like to the first-group unit 111. This can provide an exterior hiding the locking grooves 111c and the bonding portions 111d of the decentering absorption ring 113 (a configuration not exposing the locking grooves 111c and the bonding portions 111d to the outside).

In the above embodiment, the first-group unit 111 and the decentering absorption ring 113 are coupled to each other by the circumferential grooves and the engagement hooks for restriction in the optical axis direction. However, it is possible to employ a configuration in which the first-group unit 111 and the decentering absorption ring 113 are integrated in the optical axis direction and are movable in the optical-axis orthogonal direction (e.g. a configuration using a press ring and screws to prevent detachment). Also, although the first-group unit 111 and the decentering absorption ring 113 are bonded, the object of the present invention can be achieved even in a case where the first-group unit 111 and the decentering absorption ring 113 are not fixed by bonding but are given a degree of freedom in moving in the optical-axis orthogonal direction.

Advantageous Effects of This Embodiment

According to this embodiment, it is possible to provide a lens apparatus that, even after decentering adjustment of a first-group unit holding a lens, forms no gap between the first-group unit and an exterior unit and thereby suppresses entry of dust and water from the front of the lens apparatus.

Moreover, according to this embodiment, it is possible to provide a small lens apparatus that includes optical units and an exterior unit coupled at the rear side of a guide barrel and is less likely to transmit deformation of the exterior unit to the optical units inside when exterior unit receives an impact from a lateral side.

Second Embodiment

Figure 8:
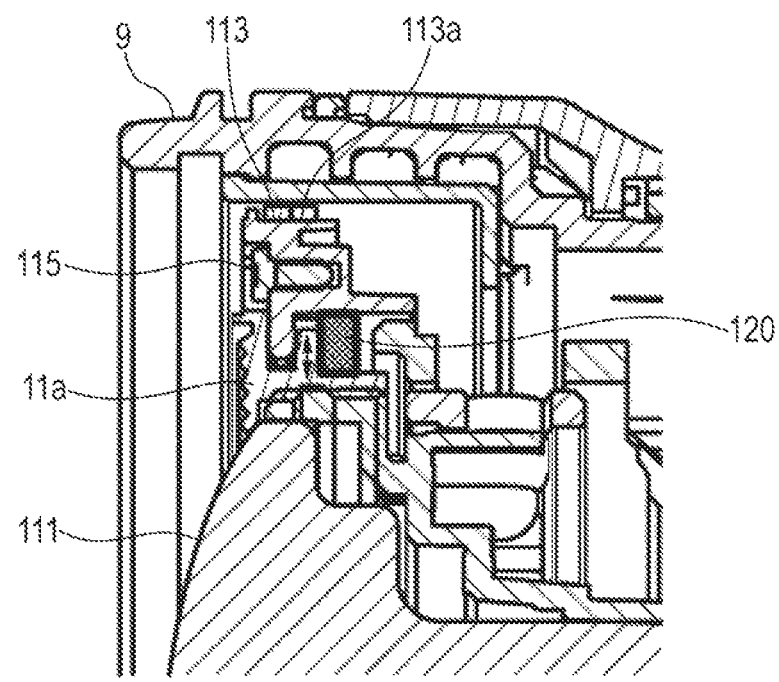
FIG. 8 is an enlarged cross-sectional view of part of a first movable group in a second embodiment.

FIG. 8 is a partially enlarged cross-sectional view of a second embodiment of the present invention. Instead of bonding the first-group unit 111 and the decentering absorption ring 113 in the first embodiment, an annular elastic member 120 is disposed radially between the first-group press ring 11a, or the first-group unit 111, and the decentering absorption ring 113, which are coupled by the circumferential grooves and the engagement hooks for restriction in the optical axis direction. The thus-disposed elastic member 120 gets deformed when receiving an impact from the outer periphery of the exterior unit 9 (capable of impact absorption). When the decentering absorption ring 113 inside is pressed, the elastic member 120 absorbs the impact, thereby can relax the impact to the first-group unit.

Note that the elastic member 120 in this embodiment may be either in a circumferentially continuous annular shape (ring shape) or in a circumferentially discontinuous annular shape (ring shape). Also, the elastic member 120 brings about a similar advantageous effect even by being disposed not radially between the first-group press ring 11a and the decentering absorption ring 113 but between the engagement hooks 113b (FIG. 4) of the decentering absorption ring 113 and the optical axis restriction grooves 111b (FIG. 3) of the first-group unit 111.

Modifications

Although embodiments of the present invention have been described above, the present invention is not limited to these embodiments but can be modified and changed in various ways within the gist thereof.

Modification 1

In the above embodiments, the first-group unit, which is an optical unit, is described as a zoom lens capable of varying the focal length. However, similar advantageous effects can be achieved even when the first-group unit is a focus lens capable of decentering adjustment or a single focal lens.

According to the above embodiments, it is possible to provide a lens apparatus capable of performing decentering adjustment of an optical unit and also reducing the amount of entry of dust and water from a gap between the optical unit and an exterior unit as compared to conventional structures, and to provide an image pickup apparatus using the lens apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-063525, filed Apr. 19, 2016, which is hereby incorporated by reference herein in its entirety.

What is claimed is:

1. A lens apparatus comprising:
an optical unit;
a hold member holding the optical unit;
an adjustment member for a decentering adjustment of the optical unit in a direction orthogonal to an optical-axis;
a fixed exterior unit on an outer peripheral side of the optical unit;
a decentering absorption member contacting an inner periphery of the fixed exterior unit and permitting movement of the optical unit in the direction orthogonal to the optical-axis, the decentering absorption member being configured to restrict a relative movement of the hold member with respect to the decentering absorption member; and
an adhesive positioned between the hold member and the decentering absorption member.

2. A lens apparatus according to claim 1, wherein the decentering absorption member comprises a decentering absorption ring and a slide member on an outer periphery of the decentering absorption ring.

3. A lens apparatus according to claim 1, wherein the decentering absorption member consists of only a decentering absorption ring.

4. A lens apparatus according to claim 1, wherein:
the optical unit is movable in an optical-axis direction, and
the decentering absorption member is movable together with the optical unit in the optical-axis direction while sliding on the inner periphery of the exterior unit.

5. A lens apparatus according to claim 4, further comprising:
a guide barrel comprising a guide groove; and
a cam ring comprising a cam groove and being capable of rotating relative to the guide barrel,
wherein the optical unit is supported in the guide groove and the cam groove by a cam follower and is movable in the optical-axis direction with rotation of the cam ring.

6. A lens apparatus according to claim 1, wherein one of the hold member or the decentering absorption member comprises a protruding portion, and the other comprises a recessed portion.

7. A lens apparatus according to claim 1, further comprising:
a guide barrel holding the optical unit,
wherein the exterior unit is coupled to the guide barrel on an image plane side of the lens apparatus relative to the optical unit.

8. A lens apparatus according to claim 1, wherein the decentering absorption member comprises an engagement hook for bayonet-coupling to the optical unit.

9. A lens apparatus according to claim 1, wherein the decentering absorption member permits movement of the optical unit in the direction orthogonal to the optical-axis with at least a part of the decentering absorption member fixed in the direction orthogonal to the optical-axis.

10. A lens apparatus according to claim 1, further comprising an elastic member configured to absorb impact between the decentering absorption member and the optical unit in the direction orthogonal to the optical-axis.

11. A lens apparatus according to claim 1, further comprising:
a facing member held on the optical unit,
wherein the facing member hides the decentering absorption member so that the decentering absorption member is not exposed to outside.

12. An image pickup apparatus comprising:
a camera body comprising an image pickup element; and
a lens apparatus mountable to the camera body,
wherein the lens apparatus comprises:
an optical unit;
a hold member holding the optical unit;
an adjustment member for a decentering adjustment of the optical member in a direction orthogonal to an optical-axis;
a fixed exterior unit on an outer peripheral side of the optical unit;
a decentering absorption member contacting an inner periphery of the fixed exterior unit and permitting movement of the optical unit in the direction orthogonal to the optical-axis, the decentering absorption member being configured to restrict a relative movement of the hold member with respect to the decentering absorption member; and
an adhesive positioned between the hold member and the decentering absorption member.

13. A lens apparatus according to claim 1, wherein the adhesive is positioned between the hold member and the decentering absorption member in the direction orthogonal to the optical-axis.

14. A lens apparatus comprising:
an optical unit;
a hold member that holds the optical unit by contacting the optical unit;
an adjustment mechanism that adjusts the optical unit in a direction orthogonal to an optical-axis of the optical unit;
a decentering permitting member that permits movement of the optical unit in the direction orthogonal to the optical-axis of the optical unit; and
a fixed exterior unit on an outer peripheral side of the optical unit,
wherein the decentering permitting member contacts an inner periphery of the fixed exterior unit,
wherein the decentering permitting member is disposed to interpose a gap between the hold member and the decentering permitting member in the direction orthogonal to the optical-axis of the optical unit, and
wherein part of the hold member contacts part of the decentering permitting member, and the part of the hold member overlaps the part of the decentering permitting member when viewed in a direction parallel to the optical-axis of the optical unit.

15. A lens apparatus according to claim 14, further comprising an adhesive positioned between the hold member and the decentering permitting member.

16. A lens apparatus according to claim 14, wherein the decentering permitting member is configured to restrict a relative movement of the hold member with respect to the decentering permitting member in the direction parallel to the optical-axis of the optical unit.

17. A lens apparatus according to claim 14, wherein the part of the hold member overlaps the part of the decentering permitting member so that the gap between the hold member and the decentering permitting member is not viewable.

18. A lens apparatus according to claim 14, wherein the decentering permitting member comprises a decentering permitting ring and a slide member on an outer periphery of the decentering permitting ring.

19. A lens apparatus according to claim 14, wherein the decentering permitting member consists of a decentering permitting ring.

20. A lens apparatus according to claim 14, wherein:
the optical unit is movable along an optical-axis direction, and
the decentering permitting member is movable together with the optical unit in the optical-axis direction while sliding on the inner periphery of the fixed exterior unit.

21. A lens apparatus according to claim 20, further comprising:
a guide barrel including a guide groove; and
a cam ring including a cam groove and being rotatable relative to the guide barrel,
wherein the optical unit is supported in the guide groove and the cam groove by a cam follower and is movable in the optical-axis direction with rotation of the cam ring.

22. A lens apparatus according to claim 14, wherein one of the hold member or the decentering permitting member comprises a protruding portion, and the other thereof comprises a recessed portion.

23. A lens apparatus according to claim 14, further comprising:
a guide barrel holding the optical unit,
wherein the fixed exterior unit is coupled to the guide barrel on an image plane side of the lens apparatus relative to the optical unit.

24. A lens apparatus according to claim 14, wherein the decentering permitting member includes an engagement hook for bayonet-coupling to the optical unit.

25. A lens apparatus according to claim 14, wherein the decentering permitting member permits movement of the optical unit in the direction orthogonal to the optical-axis of the optical unit with at least part of the decentering permitting member fixed in the direction orthogonal to the optical-axis of the optical unit.

26. A lens apparatus according to claim 14, further comprising an elastic member configured to absorb impact between the decentering permitting member and the optical unit in the direction orthogonal to the optical-axis of the optical unit.

27. A lens apparatus according to claim 14, further comprising:
a facing member held on the optical unit,
wherein the facing member hides the decentering permitting member so that the decentering permitting member is not exposed to outside.

28. An image pickup apparatus comprising:
a camera body including an image pickup element; and
a lens apparatus mountable to the camera body and comprising:
an optical unit;
a hold member that holds the optical unit by contacting the optical unit;
an adjustment mechanism that adjusts the optical unit in a direction orthogonal to an optical-axis of the optical unit;
a decentering permitting member that permits movement of the optical unit in the direction orthogonal to the optical-axis of the optical unit; and
a fixed exterior unit on an outer peripheral side of the optical unit,
wherein the decentering permitting member contacts an inner periphery of the fixed exterior unit,
wherein the decentering permitting member is disposed to interpose a gap between the hold member and the decentering permitting member in the direction orthogonal to the optical-axis of the optical unit, and
wherein part of the hold member contacts part of the decentering permitting member, and the part of the hold member overlaps the part of the decentering permitting member when viewed in a direction parallel to the optical-axis of the optical unit.

29. An image pickup apparatus according to claim 28, further comprising an adhesive positioned between the hold member and the decentering permitting member in the direction orthogonal to the optical-axis of the optical unit.

* * * * *